Aug. 4, 1964
W. B. GROSS
3,142,981
DIGITAL FORCE TRANSDUCER
Filed Nov. 22, 1960
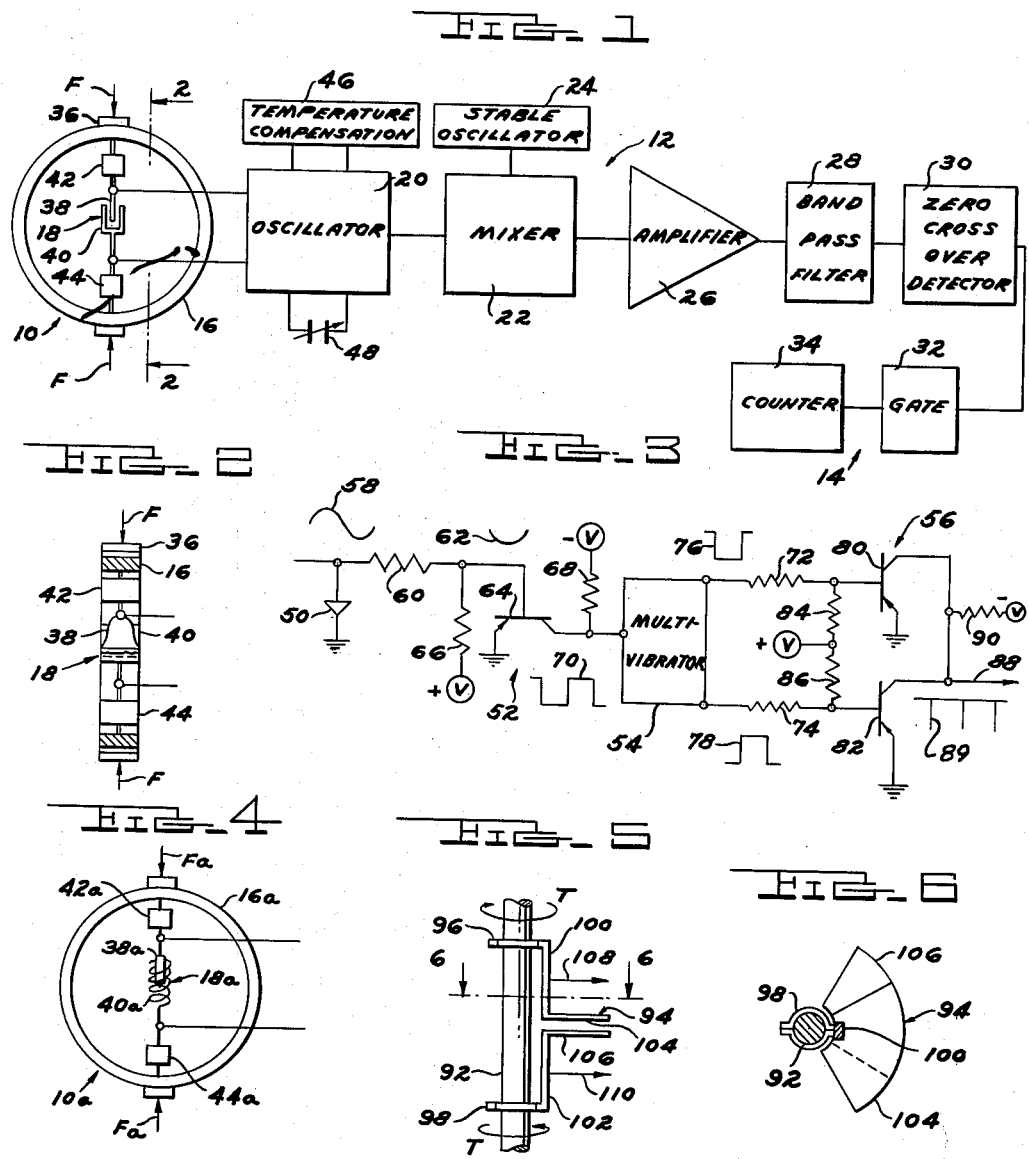
INVENTOR.
WILLIAM B. GROSS
BY Whittemore
Hulbert & Belknap
ATTORNEYS

United States Patent Office 3,142,981
Patented Aug. 4, 1964

3,142,981
DIGITAL FORCE TRANSDUCER

William B. Gross, Oak Park, Mich., assignor to Performance Measurements Company, Detroit, Mich., a corporation of Michigan
Filed Nov. 22, 1960, Ser. No. 71,015
5 Claims. (Cl. 73—141)

The invention relates to measuring devices and refers more specifically to a transducer for producing digital electric signals at a rate proportional to the magnitude of a force and means for counting the electric signals produced in a predetermined period as a measure of the magnitude of the force.

In the past transducers for producing digital electric signals at a rate proportional to a force applied thereto have not been used as widely as they might be due to the usual complicated construction thereof and their consequent expense and relative unreliability. This has been particularly true in transducers using a zero crossover detector. Another problem with prior transducers has been in providing a force sensing unit having a substantially linear response within the elastic limits of the sensing member over the force range expected during use of the transducer.

It is therefore one of the objects of the present invention to provide a transducer for producing digital electric signals representative of a force applied to the transducer.

Another object is to provide a transducer including means for sensing the magnitude of a force applied thereto, means connected to the sensing means for producing digital electric signals representative of the force applied to the sensing means and means for counting the digital electric signals produced by the signal producing means in a predetermined period.

Another object is to provide a transducer as set forth above wherein the sensing means comprises a member deformable on application of a force thereto and an electric circuit component mounted on the deformable member so that the electrical characteristics of the circuit component change in proportion to the deformation of the deformable member.

Another object is to provide a transducer as set forth above wherein the circuit component is formed to compensate for non-linearity in the deformation of the deformable member on application of a force thereto.

Another object is to provide a transducer as set forth above wherein the deformable member is a load ring and the circuit component is a capacitor connected across the diameter of the load ring.

Another object is to provide a transducer as set forth above wherein the means for producing digital electric signals representative of the force applied to the sensing means comprises a mixer, a stable oscillator for feeding a fixed frequency into the mixer, a variable frequency oscillator having the electric component, the electrical characteristics of which change with the deformation of the deformable member, in the tank circuit thereof, said variable frequency oscillator being operable to feed a frequency into the mixer which varies in accordance with the force applied to the sensing means, an amplifier for amplifying the plurality of frequencies produced in a mixer, a band pass filter for filtering the sum or difference frequency from the frequencies present in the amplifier output and a zero cross-over detector to produce the digital signals at a rate proportional to the frequency of the signal received from the band pass filter.

Another object is to provide a zero cross-over detector comprising a multi-vibrator, means for producing a trigger pulse for the multi-vibrator from a sine wave input, a pair of saturable transistors in the output of the multi-vibrator, and means for saturating the transistors except during voltage level changes in the multi-vibrator whereby digital electric signals are produced at the rate of the trigger pulse input to the multi-vibrator.

Another object is to provide a digital force transducer as set forth above which is simple in construction, economical to manufacture and efficient in use.

Other objects and features of the invention will become apparent as the description proceeds, especially when taken in conjunction with the accompanying drawings, illustrating preferred embodiments of the invention, wherein:

FIGURE 1 is a partly diagrammatic and partly block diagram of a transducer constructed in accordance with the invention.

FIGURE 2 is a section of the force sensing portion of the transducer illustrated in FIGURE 1 taken on line 2—2 in FIGURE 1.

FIGURE 3 is a partly schematic, partly block diagram of the zero cross-over detector of the transducer illustrated in FIGURE 1.

FIGURE 4 is a diagrammatic representation of a modification of the force sensing portion of the transducer illustrated in FIGURE 1.

FIGURE 5 is a diagrammatic view of a modification of the force sensing portion of the transducer illustrated in FIGURE 1.

FIGURE 6 is a cross section of the transducer force sensing portion illustrated in FIGURE 5 taken on the line 6—6 in FIGURE 5.

With particular reference to the figures one embodiment of the invention will now be disclosed.

As shown in FIGURE 1 the digital force transducer of the invention comprises a force sensing portion 10, means 12 for producing digital electric signals at a rate proportional to the magnitude of the force applied to the force sensing portion of the transducer, and means 14 for counting the number of digital electric signals produced by the signal producing means 12 in a predetermined period.

In operation a force indicated by arrows F is applied to the load ring 16 of the force sensing portion 10 of the transducer to deform the load ring whereby the electric characteristics of the capacitor 18 are changed. Changing the electric characteristics of the capacitor 18 varies the frequency of the oscillator 20 which frequency is mixed in mixer 22 with a fixed frequency from the stable oscillator 24. The output of the mixer 22 is amplified through amplifier 26 of the signal producing means 12, after which the sum or difference frequency is filtered from the amplifier 26 by the band pass filter 28 and is then passed to the zero cross-over detector 30 in which digital electric signals are produced at a rate proportional to the frequency passed by the band pass filter 28. The signals from the cross-over detector 30 are fed through the gate 32 to the counter 34 so that the digital electric signals occurring in a predetermined period are counted by the counter 34 of the counting means 14.

More specifically the force sensing means 10 includes a load ring 16 and means 36 for applying a force F thereto to cause a deformation of the load ring 16. The load ring 16 may be constructed of high grade steel having substantially linear deformation characteristics over a wide range of forces applied thereto. Other material, such as plastics and light weight metals, may be used for the load ring 16 providing the material has a predictable deformation characteristic within the elastic limit of the material over the force range expected in operation of the transducer.

The capacitor 18 of the force sensing portion 10 of the transducer shown in FIGURE 1 includes the separate plates 38 and 40 which are secured to the load ring 16 at diametrically opposite points through the insulating blocks 42 and 44. Thus, as the load ring deforms due to the forces F applied thereto, the plates 38 and 40 of the capacitor are caused to move relative to each other to change the capacitance of the capacitor 18, as will be understood by those in the art.

As shown best in FIGURE 2 the plate 38 of the capacitor 18 is non-uniformly formed. That is to say, the area of the plate 38 is such that for a unit deformation of the load ring 16 the additional area of the plate 38 which is placed between the plates 40 of the capacitor 18 is not always the same. The particular configuration of the plate 38 illustrated in FIGURE 2 is only representative of one possible configuration thereof.

The exact configuration of the plates 38 and 40 in accordance with the invention is chosen to eliminate any non-linearity in the deformation of the load ring 16 due to forces applied thereto so that the digital electric signals produced by the signal producing means 12 in a predetermined period will be proportional to the magnitude of the force applied to the load ring. Thus exact linearity of the deformation of the load ring 16 over the entire force range expected is not required in accordance with the invention.

The capacitor 18, the capacitance of which varies with the force applied to the load ring 16, is connected to control the output frequency of the oscillator 20 in accordance with the change of capacitance thereof. It will be understood by those in the art that such operation may be accomplished in various ways, such as placing the capacitor 18 in the tank circuit of the oscillator 20.

Oscillator 20 is further provided with temperature compensation so that the frequency of the oscillator 20 will be identical for the same forces applied to the load ring 16 over the usual operating temperature range of the transducer of the invention. Thus, the temperature compensation means 46 compensates for the effect of temperature on the deformation characteristics of the load ring 16 and the change in electrical characteristics of the capacitor 18 due to temperature. The temperature compensation means may, for example, be a temperature responsive resistor, such as a thermistor, connected in the circuit of oscillator 20.

Oscillator 20 is further provided with a variable capacitor 48 for producing a zero sum or difference frequency from the mixer 22 before the force to be measured is applied to the load ring 16 as will be considered subsequently.

Stable oscillator 24 is provided to produce a stable frequency within the frequency range of the oscillator 20 as adjusted by the capacitor 48. The mixer 22 receives signals from both the stable oscillator 24 and the oscillator 20 whose frequency varies with the force applied to the load ring 16 and mixes the frequencies to produce a sum and a difference frequency as well as the frequency of the oscillators 20 and 24 in the well known manner.

Amplifier 26 receives and amplifies the entire freqency range of the output of the mixer 22 and passes the amplified signals to the band pass filter 28. Band pass filter 28 is provided to filter from the frequencies fed thereto by the amplifier 26 either the sum or the difference frequency produced by the mixer 22. The band pass filter 28 thus prevents spurious results and for the present example will be considered to select the difference frequency for passing to the zero cross-over detector 30. Thus the signal passed to the zero cross-over detector 30 will be a sinusoidal electric wave having a frequency representative of the magnitude of the force applied to the load ring 16.

The zero cross-over detector 30 which is best shown in FIGURE 3 is operable to produce digital electric signals at the frequency of the sinusoidal signal delivered thereto by the band pass filter 28. The zero cross-over detector 30 comprises the rectifier 50, trigger producing circuit 52, multi-vibrator 54 and coincidence circuit 56.

In operation the sinusoidal signal 58 is fed across the rectifier 50 through the resistor 60 to produce a negative going half-wave signal 62 at the base of the transistor 64 of the trigger pulse producing circuit 52. The transistor 64 which is biased positively by a voltage source (not shown) through resistor 66 and which has a negative potential applied to the collector thereof through the resistor 68 is normally non-conducting without the signal 62 appearing at the base thereof and saturates when the half-wave signal 62 reaches a predetermined value. The negative going square trigger pulses 70 are thus produced at the collector of the transistor 64.

The trigger pulse 70 is used to actuate the multi-vibrator 54 so that the outputs from the two sides of the multi-vibrator 54 through the resistors 72 and 74 are the oppositely going square waves 76 and 78.

The transistors 80 and 82 of the coincidence circuit 56 are biased through resistors 84 and 86 to staturation by a negative going output from the respective sides of the multi-vibrator 54. Thus the output from the transistors 80 and 82 will be zero except during the brief period when the sides of the multi-vibrator are changing potential level. At the zero cross-over voltage the transistors 80 and 82 are both non-conducting so that the output on line 88 at this time will be a negative going digital electric signal 89 having the value of the collector voltage of the transistors 80 and 82 as fed thereto through the resistor 90.

The gate 32 repetitively passes the digital electric signals developed by the zero cross-over detector 30 during predetermined periods to the counter 34. The counter 34 thus repetitively counts the digital electric signals passed through gate 32 in predetermined periods. Counter 34 may be arranged to indicate the magnitude of the force applied to the load ring 16 directly rather than the number of digital electric signals counted thereby if so desired.

Thus in over-all operation of the transducer of the invention the transducer is positioned so that the force F may be applied to the load ring 16 through the loading means 36. The power which must be supplied to the electrical components of the transducer and which is not shown inasmuch as the energizing of the electrical components shown is well known in the art is applied to the transducer whereby the stable oscillator feeds a predetermined frequency to the mixer 22.

The capacitor 48 is then adjusted to produce a frequency from oscillator 20 exactly equal to that of the stable oscillator 24 with no force applied to the load ring 16. Thus the counter will at this time register zero force applied to the load ring 16.

Load is then applied to load ring 16 to vary the position of the plates 38 and 40 of the capacitor 18 whereby the frequency of the oscillator 20 is changed an amount proportional to the force applied to the load ring 16. The mixer 22 will therefore produce a difference frequency on mixing of the signals from the oscillators 20 and 24 which is amplified in the amplifier 26 and passed through the band pass filter 28 which discriminates against the other frequencies produced by the mixer 22.

The zero cross-over detector then acts as described immediately above to produce digital electric signals at a rate proportional to the force applied to the load ring 16 which signals are gated through the gate 32 to the counter 34. The counter 34 repetitively counts the number of digital electric signals produced during a predetermined time which is a measure of the magnitude of the force applied to the load ring 16.

In such operation there is no variance in the indication of the counter because of the temperature at which the transducer operates due to the provision of the temperature compensation means 46 in conjunction with the oscillator 20. Further there is no inaccuracy in the results provided by the counter 34 due to non-linearity of the deformation of the load ring 16 over the force range applied thereto due to the shape of the plate 38 of the capacitor 18.

The modified force sensing portion 10a, as shown in FIGURE 4, is similar in all respects to the force sensing portion 10 of FIGURE 1, except that an inductor 18a replaces the capacitor 18, which inductor includes the coil 40a and the shaped core 38a. Thus in operation the force sensing portion 10a will operate similarly to the force sensing portion 10 to change the frequency of oscillation of the oscillator 20 in accordance with the force Fa applied thereto by changing the inductance in the tank circuit of the oscillator 20 as will be understood by those in the art.

The modified force sensing portion shown in FIGURES 5 and 6 comprises a torsion bar 92 to which a torsional force T to be measured may be applied. The torsion bar 92 has the capacitor 94 secured thereto at longitudinally separated points therealong by means of the insulating members 96 and 98 and the longitudinally extending bars 100 and 102. Thus in operation the plates 104 and 106 of the capacitor 94 move relative to each other on deformation of the torsion bar 92 due to a torsional force applied thereto to change the capacitance in the oscillator circuit 20 to which the bars 100 and 102 may be connected by means of conductors 108 and 110.

The drawings and the foregoing specification constitute a description of the improved digital force transducer in such full, clear, concise and exact terms as to enable any person skilled in the art to practice the invention the scope of which is indicated by the appended claims.

What I claim as my invention is:

1. Apparatus for measuring the magnitude of a force applied thereto comprising a load ring, means for applying a radially directed force to the load ring for deforming the load ring in accordance with the magnitude of the force applied thereto, a condenser including a single plate movable between a pair of parallel plates, insulating means connecting the condenser to the load ring between the points of application of the force thereto for producing relative movement between the plates on deflection of the load ring, a variable frequency oscillator having a tank circuit means of the variable frequency oscillator whereby the frequency of the oscillator varies in accordance with the movement of the plates of the capacitor due to the deformation of the load ring, a stable oscillator for producing a fixed frequency electrical signal, a mixer connected to receive the output signals of the oscillators for mixing the electrical signals from the stable oscillator and from the variable frequency oscillator to provide a difference frequency output signal the frequency of which is dependent on the force applied to the load ring, a band past filter tuned to pass the difference frequency output of the mixer, connected to receive the mixer output, a zero cross-over detector including a grounded diode for providing a unidirectional electrical signal at a frequency equal to the difference frequency connected to receive the output of the filter, a grounded emitter trigger pulse transistor the base of which is connected to receive the unidirectional electrical signal through a resistor, a source of electrical energy connected to the collector of the transistor and means for biasing the transistor to cut-off except when the unidirectional electric signal applied to the base thereof reaches a predetermined value to saturate the transistor and produce a square wave trigger pulse, a multi-vibrator having an output of oppositely going square waves triggered by the trigger pulse transistor output and an output circuit connected to the double output of the mutli-vibrator including a pair of transistors having collectors connected together and to a source of electrical potential through a resistor, grounded emitters and bases connected respectively to the square waves output of the multi-vibrator through a resistor and connected together through a center tapped resistor and means connected to the center tap of the center tapped resistor for biasing the last two mentioned transistors to cut-off except when both multi-vibrator outputs are at a substantially zero voltage during change of state thereof whereby a plurality of digital signals proportional in number to the difference frequency are produced at the collector of the last two mentioned transistors, and a gate circuit and counter connected in series to the output of the last two transistors for counting the number of pulses produced in a predetermined period of time as a measure of the magnitude of the force.

2. Structure as set forth in claim 1 wherein one of the plates of the condenser is shaped for providing a capacitance change on movement thereof relative to the other plates for providing a linear relationship between the force producing the movement and the frequency change resulting from the movement.

3. A zero cross-over detector for converting a variable frequency electric signal into a plurality of digital electric signals the number of which is proportional to the frequency of the variable electric signal, comprising means for receiving the variable frequency electric signal and producing an electric trigger pulse therefrom at a frequency proportional to the frequency of the variable electric signal, a multi-vibrator having oppositely going square wave output signals, means for triggering the multi-vibrator with the trigger pulse and an output circuit connected to receive the output signals of the multi-vibrator including a pair of grounded emitter saturable transistors, means connecting the collectors of the transistors together and to a source of electric energy through a resistor, means connecting the base of the transistors to the separate output signals of the multi-vibrator and means for biasing the transistors to cut-off when the output signals applied thereto are at or below zero cross-over potential during multi-vibrator change of state.

4. Structure as set forth in claim 3 wherein the means for producing an electric trigger pulse comprises a grounded receiver for receiving the variable frequency electric signal and producing a unidirectional electric signal therefrom at a frequency proportional to the frequency of the variable frequency signal, a saturable transistor the base of which is connected through a resistor to receive the unidirectional electric signal, a source of electrical energy connected to the collector of the transistor and means for biasing the transistors to cutoff except when the unidirectional electric signal applied to the base thereof reaches a predetermined value whereby the transistor is saturated to produce a square wave output signal.

5. Structure as set forth in claim 3 wherein the means for biasing the transistors to cut-off comprises a center tapped resistor connecting the bases of the transistors and a source of unidirectional electric energy connected to the center tap of the center tapped resistor.

References Cited in the file of this patent

UNITED STATES PATENTS

| | | |
|---|---|---|
| 2,217,539 | De Brun | Oct. 8, 1940 |
| 2,525,587 | Cahn | Oct. 10, 1950 |
| 2,611,266 | Wiancko | Sept. 23, 1952 |
| 2,732,713 | Willits | Jan. 31, 1956 |
| 2,780,795 | Ambrosio | Feb. 5, 1957 |
| 2,840,709 | Blankenbaker | June 24, 1958 |
| 3,043,964 | Seidman | July 10, 1962 |
| 3,071,725 | McWaid | Jan. 1, 1963 |

FOREIGN PATENTS

| | | |
|---|---|---|
| 813,261 | Great Britain | May 13, 1959 |

OTHER REFERENCES

Maskiner, E. C.: "Moisture Meter for Timber," Journal of Scientific Instruments, vol. 24, August 1947, page 219.

Text entitled "Mechanical Measurements by Electrical Methods," by Howard C. Roberts, The Instruments Publishing Co., Inc., 1951, pages 7–37 relied upon.

"General Electric Transistor Manual," fifth edition, 1960, pages 106–124 relied upon.